(12) United States Patent
Nishi et al.

(10) Patent No.: US 6,174,000 B1
(45) Date of Patent: Jan. 16, 2001

(54) SCREW JOINT FOR OIL WELL PIPING

(75) Inventors: Masatsugu Nishi, Tokyo; Teruaki Suzuki, Yokohama, both of (JP)

(73) Assignees: NKK Corporation; Mitsubishi Corporation, both of Tokyo (JP)

( * ) Notice: Under 35 U.S.C. 154(b), the term of this patent shall be extended for 0 days.

(21) Appl. No.: 09/445,536
(22) PCT Filed: Apr. 12, 1999
(86) PCT No.: PCT/JP99/01920
§ 371 Date: Dec. 8, 1999
§ 102(e) Date: Dec. 8, 1999
(87) PCT Pub. No.: WO99/53232
PCT Pub. Date: Oct. 21, 1999

(30) Foreign Application Priority Data

Apr. 13, 1998 (JP) ................................. 10-100800

(51) Int. Cl.$^7$ .................................................. F16L 15/04
(52) U.S. Cl. ............................ 285/333; 285/334; 285/390
(58) Field of Search .................................. 285/334, 333, 285/390, 355

(56) References Cited

U.S. PATENT DOCUMENTS

| | | | |
|---|---|---|---|
| 5,060,740 | * 10/1991 | Yousef et al. | 285/334 |
| 5,092,635 | * 3/1992 | DeLange et al. | 285/334 |
| 5,419,595 | * 5/1995 | Yamamoto et al. | 285/334 |
| 5,829,797 | * 11/1998 | Yamamoto et al. | 285/334 |
| 5,931,511 | * 8/1999 | DeLange et al. | 285/334 |

FOREIGN PATENT DOCUMENTS 09119564   5/1997   (JP) .

OTHER PUBLICATIONS

English Abstract of JP09119564 of May 6, 1997.

* cited by examiner

*Primary Examiner*—Eric K. Nicholson
(74) *Attorney, Agent, or Firm*—Ladas and Parry

(57) ABSTRACT

A threaded joint with trapezoidal threads for oil well pipes superior in sealing performance: having a load flank angle θ1 of each thread satisfying desired conditions; having a shape of the thread such that opposite flanks of the trapezoidal thread come into contact with flanks of a corresponding thread simultaneously when the joint is so fastened as to give a threaded portion of the joint an interference Δd of not smaller than 0.12% and not larger than 0.8% of the outer diameter of a pipe to be jointed; having a gap formed between a crest and a bottom of this trapezoidal thread and set to be not larger than 0.2 mm; and having dimensional tolerances of thread width and thread height of the threads satisfying desired conditions.

2 Claims, 10 Drawing Sheets

(a)

(b)

DIMENSION UNIT: mm

SCREW JOINT FOR OIL WELL PIPING

FIELD OF THE INVENTION

The present invention relates to a threaded joint superior in sealing performance for casings/tubings, for example, used in an oil well.

BACKGROUND ART

FIG. 8 shows round threads prescribed, for example, as a threaded joint for oil well pipes by API, and used widely. The round threads are machined by rounding crests of line pipe threads (triangular threads) used conventionally, and changing the taper of the threads from 1/32 to 1/16, in order
(1) to improve the finishing accuracy of thread cutting,
(2) to reduce the stress concentration which acts on the threads,
(3) to improve the leak resistance, and
(4) to reduce the danger of damaging the threaded portion during the work of handling, transporting and stabbing.

That is, the round threads are designed as follows. Opposite flanks of each thread abut against flanks of a corresponding thread simultaneously, so that the thread clamping force increases. As the clamping force increases more, the contact pressure on each of the flanks of the thread becomes higher so that the air tightness becomes higher. However, when tensile force is applied longitudinally to a pipe provided with these threads, there is a problem of so-called jump-out that the threads are detached in the case where an oil well becomes deeper, because the angle of load flanks loaded with the tensile force is large as 30°.

FIG. 9 shows a buttress-threaded (trapezoidal-threaded) joint, which was developed in order to prevent jump-out caused by increase of the depth of an oil well. The angle of each load flank loaded with tensile force (load flank angle) is 3° so that the buttress-threaded joint is great in the joint strength and effective in the work of stabbing, or the like. However, these threads are characterized in that they have a disadvantage in leak resistance against internal pressure though the joint strength is great.

That is, in the buttress threads, grease charged into gaps which are produced between male and female threads when the male and female threads are fitted to each other, and pressure generated on each contact surface of load flanks and pin roots in the thread flanks and roots by make up of the threads (hereinafter referred to as "contact pressure") have a function of sealing the pressure of oil or gas applied on the internal surface of the pipe. Therefore, basically, as the fastening force of the threads increases, the above-mentioned contact pressure becomes high, and the leak resistance is improved. However, as shown in FIG. 10, when the contact pressure increases on the load flank which is a side surface loaded with tensile force, the threads are shifted in the longitudinal direction of the pipe because there is a gap C on the rear-side surface (stabbing flank) of the thread, so that the contact pressure of the load flank cannot become sufficiently high. That is, as is apparent from the graph of FIG. 11 showing the state of generation of contact pressure on each element of a thread when making up the buttress threads, though contact pressure must be generated on the load flanks over the whole length of a buttress threads, contact pressure is generated rather on the stabbing flanks in the small-diameter male threads. This means that the threads move in the longitudinal direction of the pipe.

Background-art threads for oil well pipes according to API as described above are tapered threads, in which make up of the threads results in that not only contact pressure on thread flanks is increased by the wedge effect so that the leak resistance is improved, but also tensile stress (hoop stress) is generated in the circumferential direction of a coupling. In addition, in the case of the buttress threads which have a large permissible tolerance in the make up position, there is a problem that hoop stress exceeds a yield strength of the material in the worst case. Further, since the above-mentioned sealing performance of the buttress threads depends on the grease charged into gaps between the threads, there is another problem even though the sealing performance is proof against the pressure of liquid, gas leaks easily because of small molecules of the gas.

In order to improve such a sealing function of the buttress threads, a joint extremely superior in the sealing performance was developed by providing a metal seal portion in which a tapered outer surface and an end surface formed in a front end portion of male threads are pushed with pressure against a tapered inner circumferential surface and a stepped portion formed in a rear end portion of female threads. However, since the metal seal portion must be high in the dimensional accuracy, there is a problem that it is difficult to finish the metal seal portion.

DISCLOSURE OF THE INVENTION

It is an object of the present invention to improve the foregoing problems of such buttress threads and so on according to the API Standards.

In order to achieve the above object, according to an aspect of the present invention, there is provided a threaded joint for oil well pipes wherein a load flank angle $\theta_1$ satisfies the following conditions (1), (2) and (3), wherein the joint has such a shape that opposite flanks of a trapezoidal thread come into contact with flanks of a corresponding thread simultaneously when the joint is so made up that an interference $\Delta d$ which is not smaller than 0.12% of the outer diameter of the pipe at a minimum and not larger than 0.8% of the outer diameter at a maximum is given to a threaded portion, wherein a gap formed between a crest and a bottom of the trapezoidal threads is set to be not larger than 0.2 mm, and wherein dimensional tolerances of thread width and thread height satisfy the following conditions (4) and (5):
(1) when t (pipe thickness)/D(pipe outer diameter)≦9%,
  $-3° \leq \theta_1 \leq 3°$;
(2) when 9% <t (pipe thickness)/D(pipe outer diameter) ≦14%,
  $-3° \leq \theta_1 \leq 0°$;
(3) when 14% <t (pipe thickness)/D(pipe outer diameter),
  $-10° \leq \theta_1 \leq 0°$;
(4) when $10° \leq |\theta_1|+|\theta_2|<20°$,
  tolerance of thread width (Wt)=±0.015 mm, and
  tolerance of thread height (Ht)=±0.015 mm,
  providing $\theta_2$ designates a stabbing flank angle;
(5) when $20° \leq |\theta_1|+|\theta_2|$,
  tolerance of thread width (Wt)=±0.025 mm, and
  tolerance of thread height (Ht)=±0.025 mm.

In the threaded joint for oil well pipes according to the present invention, which is configured as mentioned above, opposite flanks of each thread come into contact with flanks of a corresponding thread when the threads are fitted into each other with a desired interference so that extremely superior anti-jump-out performance can be obtained, and superior sealing performance can be ensured.

THE BEST MODE FOR CARRYING OUT THE INVENTION

Figure 1:
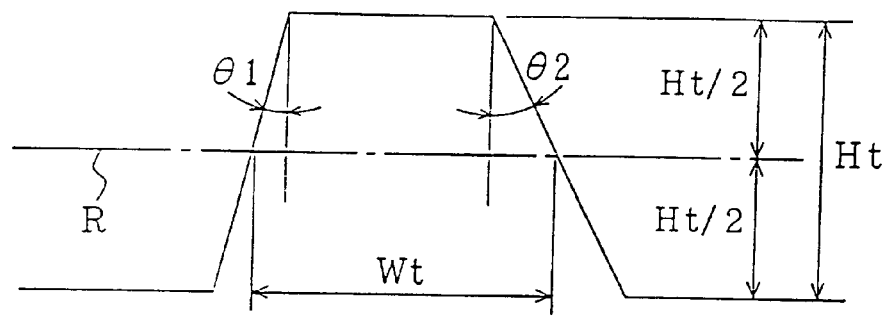
FIG. 1 is a partially enlarged explanatory view showing an embodiment of a threaded joint for oil well pipes according to the present invention.
Figure 1:
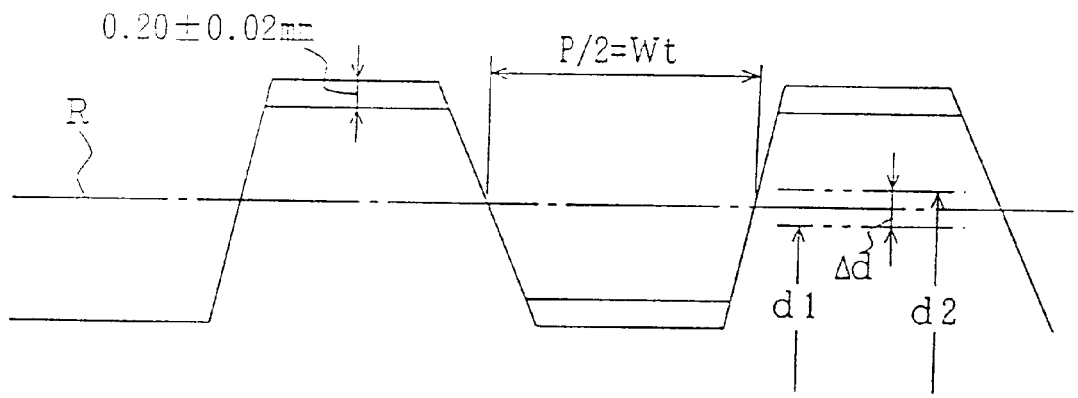
Figure 2:
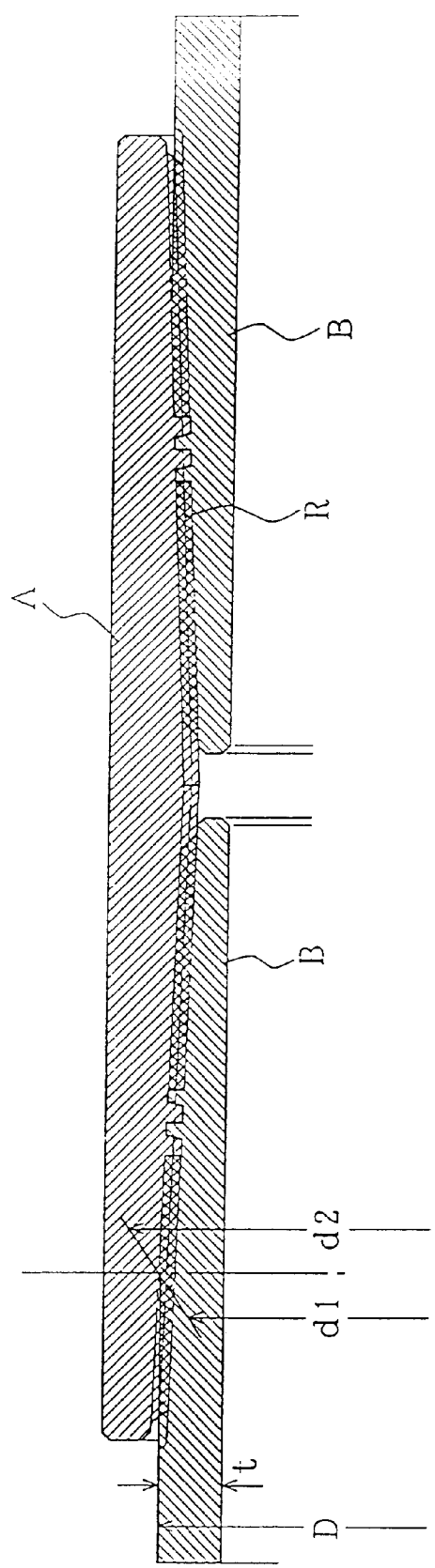
FIG. 2 is an explanatory view showing a fitting state of the embodiment of the threaded joint for oil well pipes according to the present invention.

FIG. 1 is a partially enlarged explanatory view showing an embodiment of the present invention, and FIG. 2 is an explanatory view showing a fitting state of the embodiment of the present invention. In FIGS. 1 and 2, Wt designates width of a thread; Ht, height of the thread; R, a pitch line; $\theta_1$, a load flank angle between one flank of the thread and a line segment perpendicular to the pitch line; and $\theta_2$, a stabbing flank angle between the other flank of the thread and a line segment perpendicular to the pitch line. Here, the relation $\theta_1 < \theta_2$ is established, and the load flank angle $\theta_1$ is an angle of a flank loaded with tensile force. In addition, the pitch line R is located at a height of Ht/2, and the thread width Wt is ½ of a thread pitch P.

In a threaded joint, male threads of a pipe B are connected to female threads of a coupling member A. The pitch line R of this threaded joint has a taper. When the taper has a large inclination, there is an advantage that the pipe B can be screwed up into the coupling member A by a small number of rotations. However, the strength of the threads becomes insufficient in the case where the pipe B is thin. When the taper has a small inclination, there is a disadvantage that the number of rotations increases when the pipe is screwed up into the coupling member. Therefore, an appropriate inclination is 1/16 which has been adopted in the background art, and the inclination is set to be about 1/16 also in this embodiment.

When the load flank angle $\theta_1$ is large, large stress in the circumferential direction of the coupling is generated at the time of make up of the threads or under a tensile load so as to cause stress-corrosion cracking. In order to prevent this stress-corrosion cracking and jump-out, the load flank angle $\theta_1$ is established so as to satisfy the following conditions.

(1) When t (pipe thickness)/D(pipe outer diameter)≦9%, $\theta_1 \leq 3°$ is established. However, the lower limit of $\theta_1$ is set to be −3° because there is a disadvantage in machining with $\theta_1$ smaller than −3°.

(2) When 9%<t (pipe thickness)/D(pipe outer diameter) ≦14%, $\theta_1 \leq 0°$ is established. However, the lower limit of $\theta_1$ is set to be −3° because there is a disadvantage in machining with $\theta_1$ smaller than −3°.

(3) When 14%<t (pipe thickness)/D(pipe outer diameter), $\theta_1 < 0°$ is established. However, the lower limit of $\theta_1$ is set to be −10° because there is a disadvantage in machining with $\theta_1$ smaller than −10°.

Assume that an interference of the thread portion $\Delta d = (d_1 - d_2)$ is provided when a male-thread basic diameter $d_1$ is larger than a female-thread basic diameter $d_2$. Then, in the case where a gap formed between a crest and a bottom of threads exceeds 0.2 mm at the time when make up of the threads is performed with this interference $\Delta d$, the leakproof property deteriorates extremely after grease charged into this gap is dried because of the temperature in a well. Therefore, as shown in FIG. 1(b), the thread height Ht is determined so that a gap between a crest and a bottom of threads is not larger than 0.2 mm. This gap is influenced by the combination of a tolerance of the thread height and a tolerance of the thread width.

Next, investigation will be made about the influence of the thread height tolerance and the thread width tolerance.

The gap between the crest and the bottom is simply influenced by the combination of the thread height tolerance. If the width of the male thread is narrower or the width of the female thread is wider, the gap between the crest and the bottom becomes narrower. In the contrary case, a contrary phenomenon occurs. Therefore, the thread height tolerance and the thread width tolerance must be determined so that the gap between the crest and the bottom becomes not larger than 0.2 mm at the maximum, and the crest and the bottom do not come into contact with each other earlier than the flanks even in the case of the worst combination of the thread height tolerance and thread width tolerance. That is, in order to ensure the leakproof characteristic, the gap between the crest and the bottom must be always in a range from 0 to 0.2 mm even if the worst combination of the thread height and width tolerances is provided.

For example, when the thread height tolerance occupies ±0.025 mm in the gap of 0.2 mm, a combination of the thread height tolerance of 2×0.025=0.05 mm may have an influence on the gap. Therefore, 0.15 mm of the gap is allowed for the combination of the width tolerance. In addition, as the angle $|\theta_1|+|\theta_2|$ decreases, the change of the width has a greater influence on the radial direction, so that it is necessary to set the width tolerance to be smaller. For example, in the case of a thread with $|\theta_1|+|\theta_2|=10°$, the gap between the crest and the bottom cannot be kept in the range from 0 to 0.2 mm unless both the thread height and width tolerances are kept to be not larger than 0.015 mm.

Calculation Example:

In the case of a thread with $|\theta_1|+|\theta_2|=10°$, the influence of a change $\Delta w$ of the width on the height direction becomes tan 10°=about 5.6 times as large as the change $\Delta w$. Since the change of the gap between the crest and the bottom must be kept to be less than 0.2 mm, the range of the gap allowed for the change of the thread width is 0.17 mm on the assumption that the thread height tolerance is set to be ±0.015 mm. Accordingly, the allowed amount of change in the width becomes 0.17÷5.6=0.030 mm. Therefore, the thread width tolerance becomes ±0.015 mm.

On the other hand, in the case of a thread with $|\theta_1|+|\theta_2|$, the gap between the crest and the bottom is kept in the range from 0 to 0.2 mm even if the thread height and width tolerances are ±0.025 mm.

In summary, the following rule can be provided.

The tolerances of the thread height Ht and the thread width Wt are set to be ±0.015 mm when $10°\leq|\theta_1|+|\theta_2|<20°$, while they are set to be ±0.025 mm when $20°\leq|\theta_1|+|\theta_2|$. Thus, the gap between the crest and the bottom can be always kept in a range from 0 to 0.2 mm so that a desired leakproof property can be guaranteed.

In a threaded joint configured thus for oil well pipes, leak resistance is kept when contact pressure Pc generated on each contact surface of a thread takes a value larger than gas or oil pressure Pi applied onto the internal surface of a pipe, that is, when the relation Pc>Pi is established.

Figure 3:
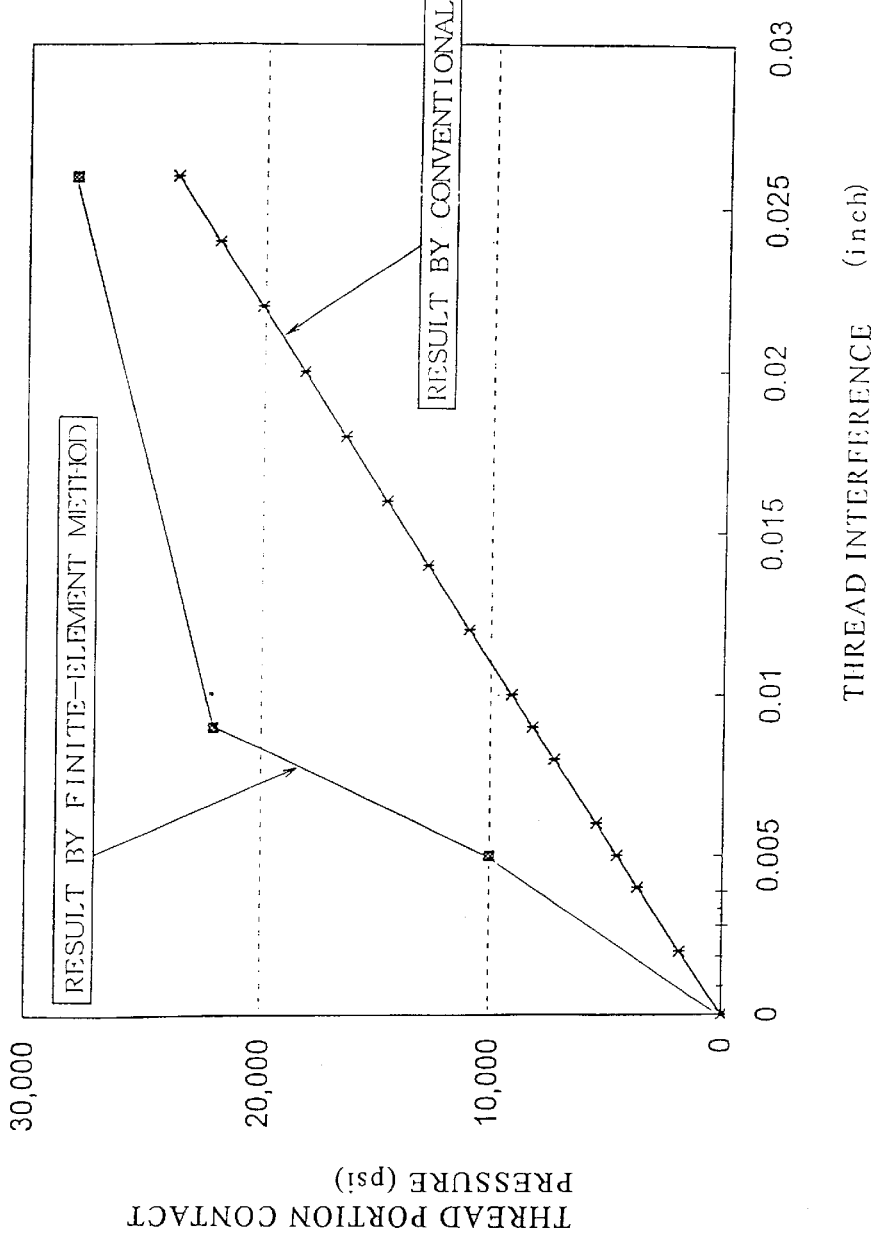
FIG. 3 is a graph of a relationship between thread interference and contact pressure in the embodiment of the threaded joint for oil well pipes according to the present invention.

When the interference in a threaded portion is Δd, the contact pressure Pc has been calculated by the following expression (6). However, in the result of calculation on the basis of a finite-element method by using a computer, it was found that the same surface pressure Pc could be obtained by half the interference Δd in the expression (6), as shown in FIG. 3.

For example, the surface pressure Pc will be calculated about an oil well pipe of 2⅞" OD×0.217" API J55. The internal-pressure resistance performance required for the pipe is 7,260 psi (lbs/in²), and the internal-pressure resistance performance required for a joint is basically the same as above. It is understood from FIG. 3 that it will go well if a thread interference Δd corresponding to 0.0035 inch is given to the threads. This is equivalent to 0.12% of the outer diameter of the pipe.

That is, when the interference Δd thus occupies 0.12% or more of the outer diameter, the relation Pc>Pi is always satisfied so that the desired leakproof performance can be obtained.

Figure 4:
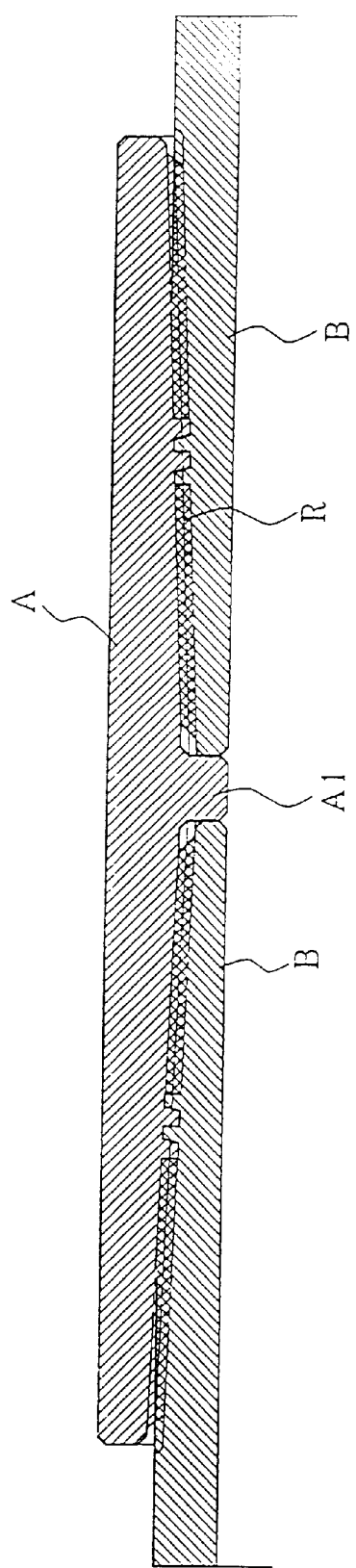
FIG. 4 is an explanatory view showing a fitting state of another embodiment of a threaded joint for oil well pipes according to the present invention.

However, when the interference Δd is taken too much, the coupling is expanded by the wedge effect so that high circumferential stress (σθ) is generated. This stress σθ is obtained by the expression (7). When the coupling is fastened at a ratio of 0.8% or more of the outer diameter thereof, hoop stress becomes too high. Therefore, an upper limit of the interference Δd is set to this value.

$$Pc = \frac{E \cdot \delta(R^2 - d^2)(W^2 - R^2)}{4R^3(W^2 - d^2)} \quad (6)$$

providing $\delta = \Delta d/2$ $$\sigma\theta = 2R^2 \cdot PC(1+W^2)/(W^2-R^2) \quad (7)$$

where E: Young's modulus of elasticity
W: coupling outer radius
R: thread pitch radius
D: pipe internal radius FIG. 4 is an explanatory view showing another embodiment of the present invention. In this threaded joint, a protrusion portion A1 is formed at the center of the coupling of the above-mentioned threaded joint. This protrusion portion A1 prevents a PIN (a male screw: pipe) from entering a BOX (a female screw: coupling) over a limit even if the PIN is rotated by large torque to give screwing force larger than a screwing limit to the PIN. As a result, in a gas or oil well to which a casing or a tubing is put down while being rotated, it is possible to prevent an outbreak of so-called jump-in where the PIN enters the BOX over a limit.

Figure 5:
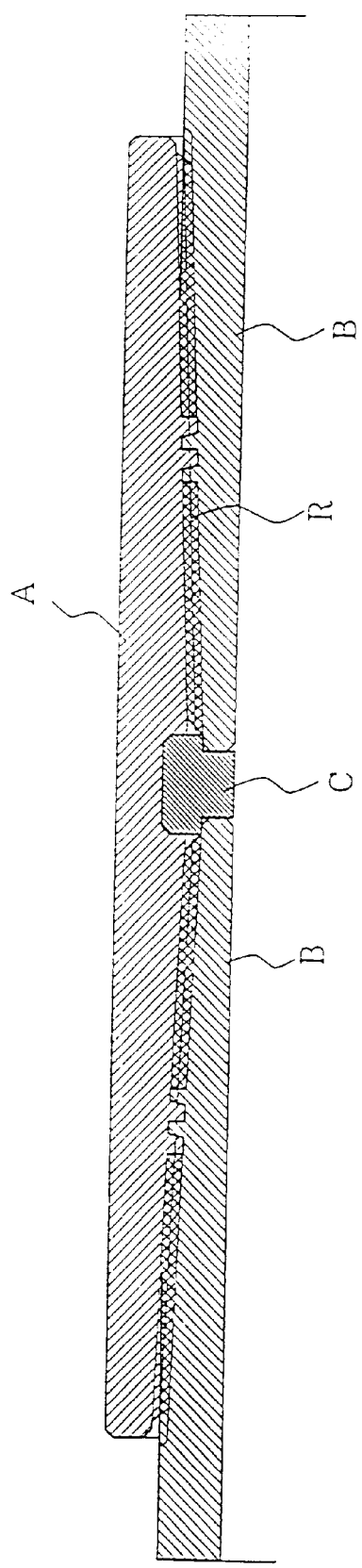
FIG. 5 is an explanatory view showing a fitting state of a further embodiment of a threaded joint for oil well pipes according to the present invention.

FIG. 5 is an explanatory view showing a further embodiment of the present invention. In this threaded joint, a sectionally T-shaped ring C of fluororesin is fitted in, as a buffer, at the center of the coupling of the above-mentioned threaded joint. In the case where corrosive gas is produced from a well, a coupling A and a pipe B each of which is coated with anti-corrosive paint such as epoxy resin or the like to form an anti-corrosive coating film are used. The T-shaped ring C prevents the anti-corrosive coating film from peeling off. The T-shaped ring C can also prevent gas or oil from flowing turbulently in the pipe.

EXAMPLE

Figure 6:
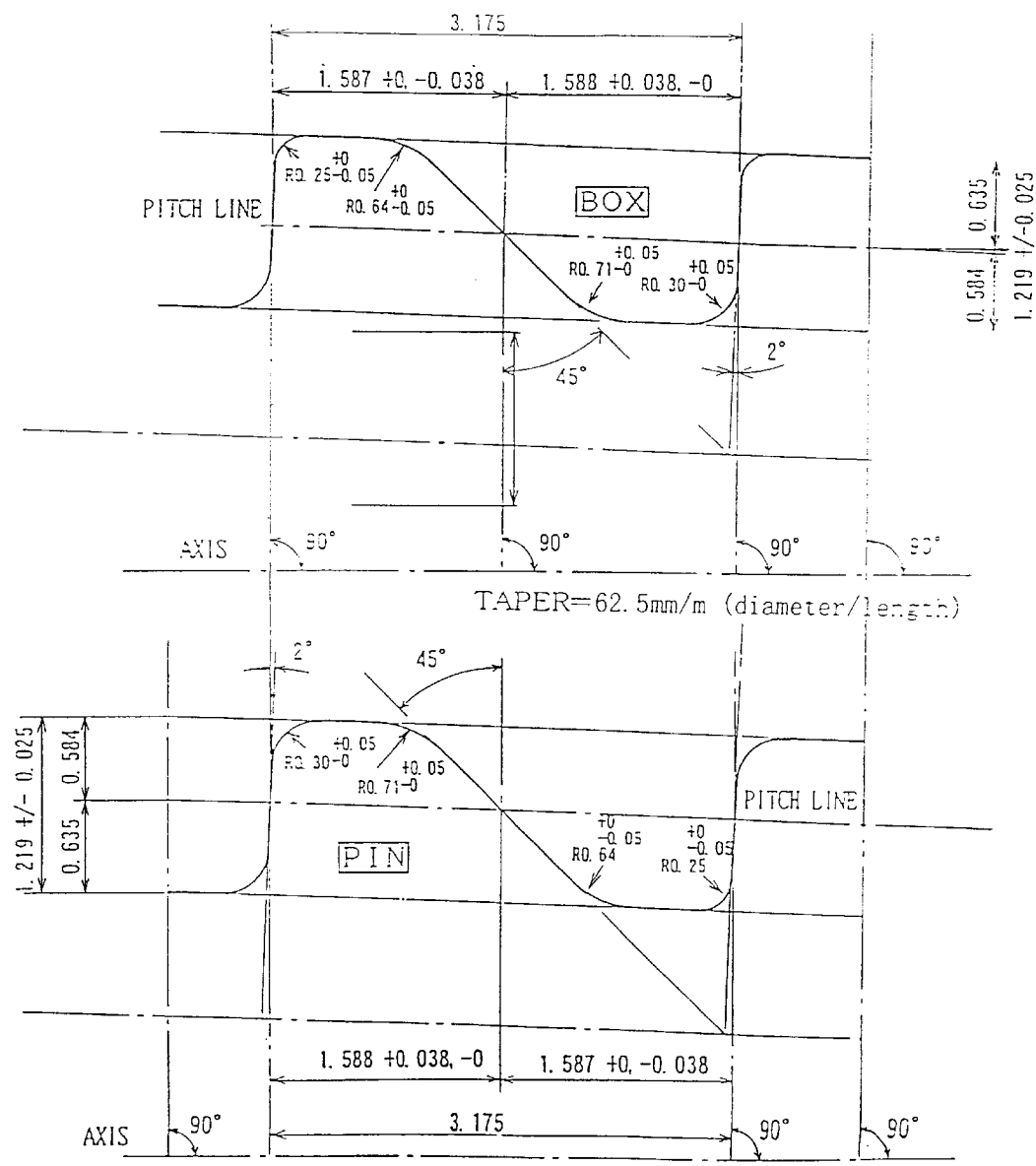
FIG. 6 is an explanatory view showing the shape of a thread in an example in which a threaded joint for oil well pipes according to the present invention is applied to tubing.
Figure 7:
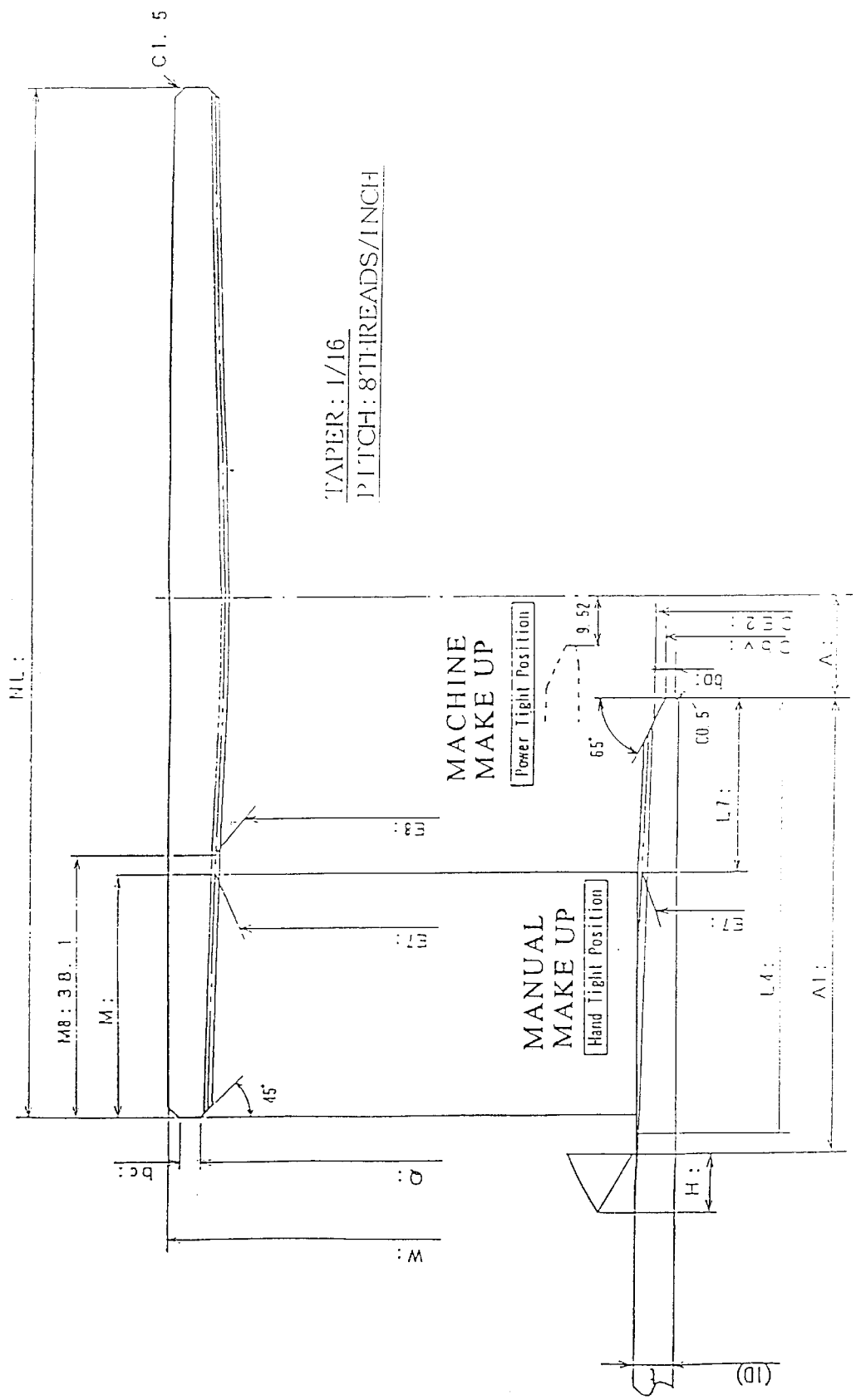
FIG. 7 is an explanatory view showing the shape of the threaded joint in the example in which the threaded joint for oil well pipes according to the present invention is applied to tubing.
Figure 8:
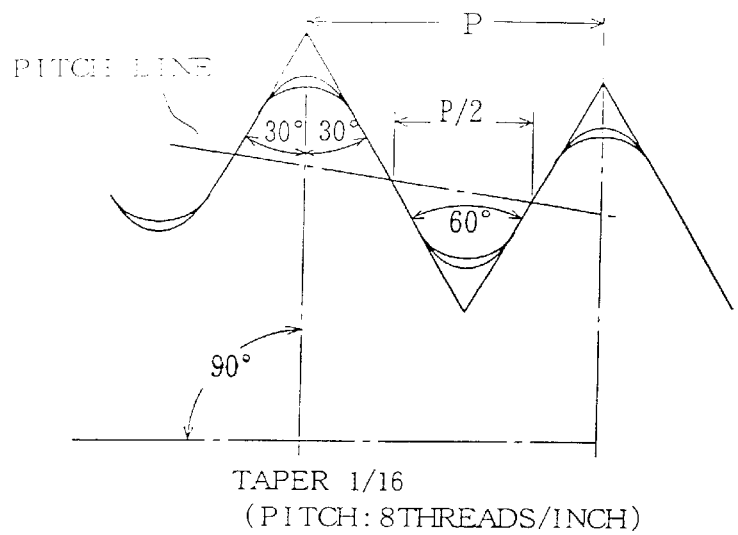
FIG. 8 is an explanatory view showing a structure of round threads according to the API Standards.
Figure 9:
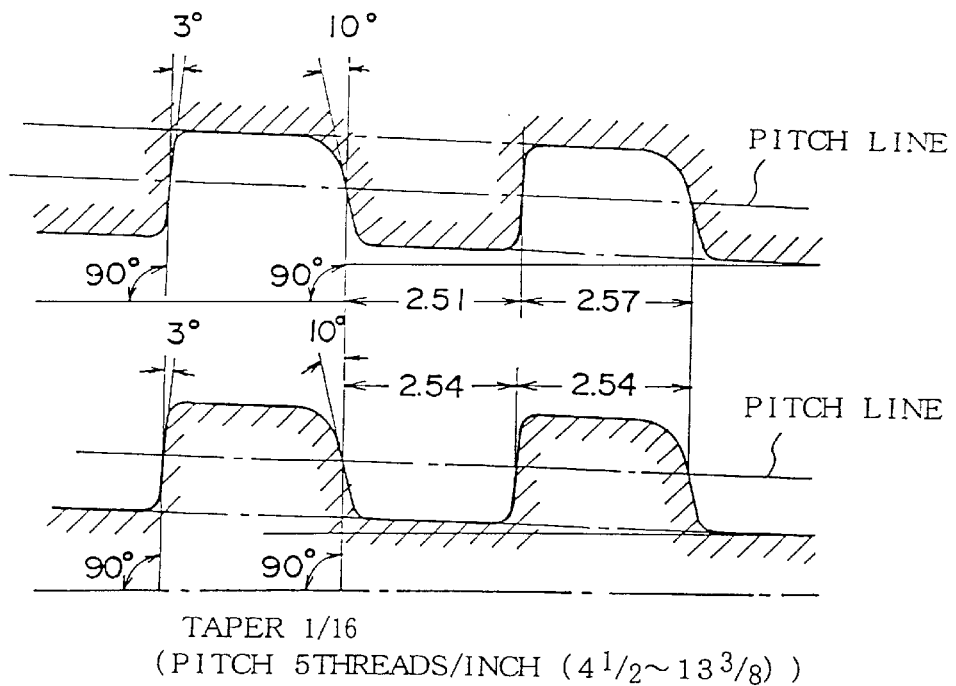
FIG. 9 is an explanatory view showing a structure of buttress threads according to the API Standards.
Figure 10:
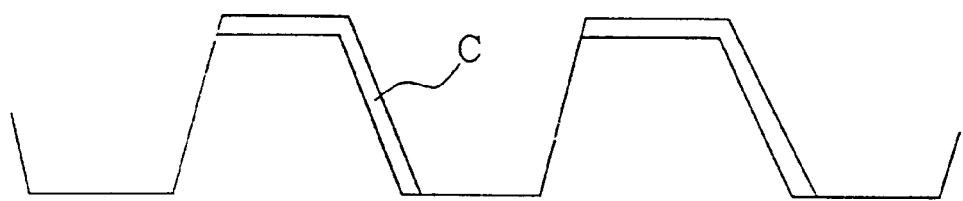
FIG. 10 is an explanatory view showing a fitting state of the buttress threads according to the API Standards.
Figure 11:
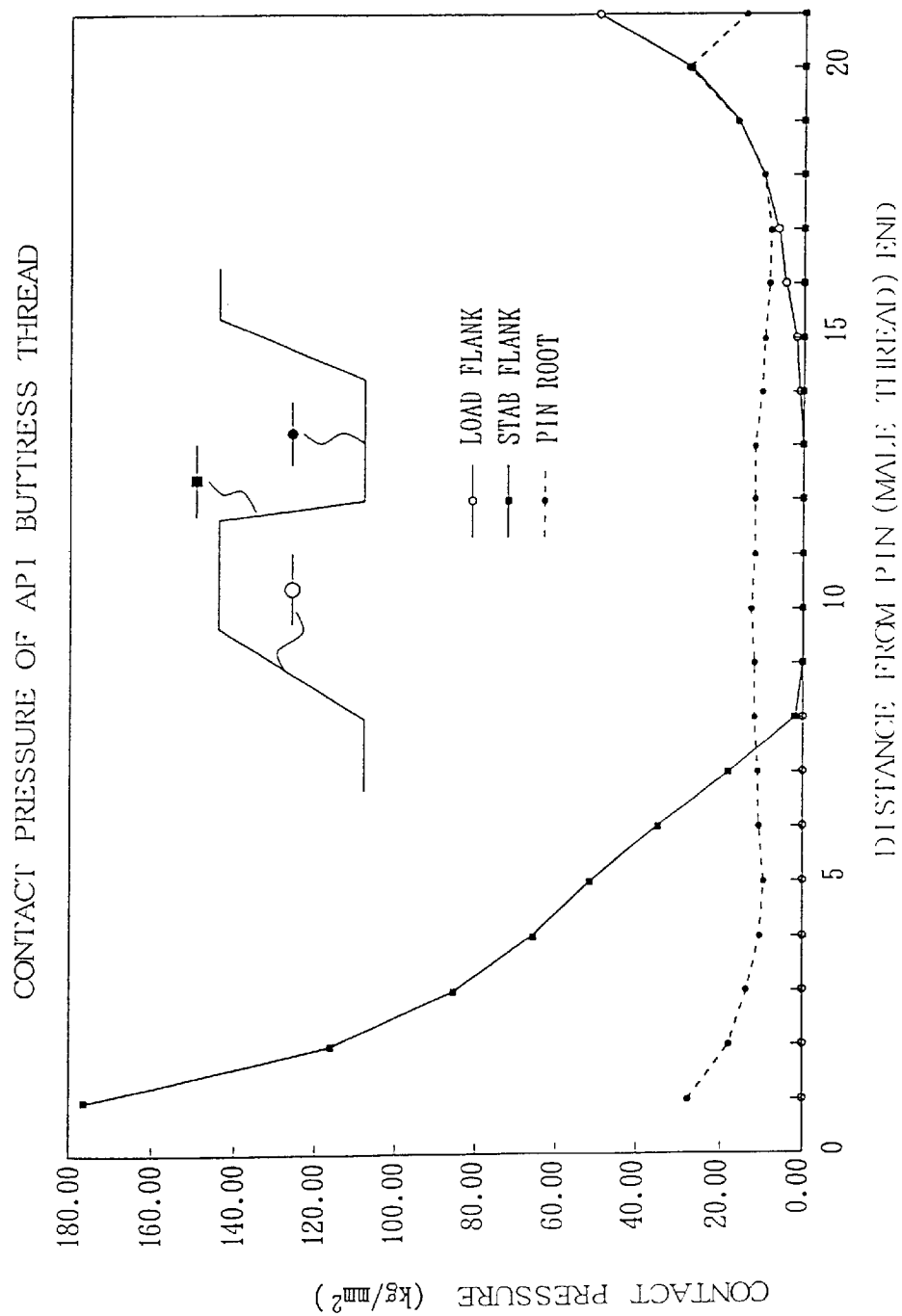
FIG. 11 is a graph showing a change of contact pressure in each portion in the fitting state of the buttress threads according to the API Standards.

The thread shape and dimensions of an example in which the present invention is applied to a tubing are shown in FIGS. 6 and 7 and Table 1. The thread shape is as shown in FIG. 6. That is, a load flank angle is 2°, a stabbing flank angle is 45°, a thread height is 1.27 mm (48/1,000 inches), a thread pitch is 8 threads/inch, and a taper is 1/16 (pipe diameter/length), which are fixed regardless of change of the outer diameter of the pipe. The dimensions of respective portions of the threaded joint (FIG. 7) are as shown in Table 1 in the case where the nominal outer diameter is 2⅜ to 4½ inches. The above-mentioned example is applicable to a casing.

TABLE 1

(unit: mm)

| given size (inch) | OD | t | (ID) | DE2 | Dbv | bp | L7 | L4 | A1 | M/U |
|---|---|---|---|---|---|---|---|---|---|---|
| 2⅜" | 60.3 | 4.83 | 50.67 | 56.21 | 54.2 | 1.52 | 25.40 | 65.80 | 68.80 | 4.88 |
| 2⅞" | 73.0 | 5.51 | 62.01 | 68.91 | 66.4 | 1.95 | 25.40 | 65.80 | 68.80 | 5.69 |
| 3½" | 88.9 | 6.45 | 76.00 | 84.81 | 82.3 | 2.91 | 25.40 | 65.40 | 68.40 | 7.32 |
| 4" | 101.6 | 5.74 | 90.12 | 97.12 | 94.6 | 2.00 | 31.70 | 71.70 | 76.70 | 8.89 |
| 4½" | 114.3 | 5.69 | 102.92 | 109.42 | 106.9 | 1.75 | 38.10 | 78.10 | 83.10 | 9.75 |

TABLE 1-continued (unit: mm)

| given size (inch) | A | H | W ±1% | NL ±3 | M | E7 ±0.0508 | M8 | E8 ±0.0508 | Q ±0.5 | bc |
|---|---|---|---|---|---|---|---|---|---|---|
| 2⅜" | 14.40 | 6.10 | 73.0 | 156.6 | 38.52 | 59.070 | 38.10 | 59.096 | 64.3 | 2.5 |
| 2⅞" | 15.21 | 8.13 | 88.9 | 156.6 | 37.71 | 71.770 | 38.10 | 71.746 | 76.9 | 4.0 |
| 3½" | 16.84 | 8.13 | 108.0 | 155.8 | 35.68 | 87.670 | 38.10 | 87.519 | 92.7 | 5.5 |
| 4" | 18.41 | 8.13 | 120.7 | 172.4 | 36.11 | 100.370 | 38.10 | 100.246 | 105.4 | 5.5 |
| 4½" | 19.27 | 8.13 | 132.1 | 185.2 | 35.25 | 113.070 | 38.10 | 112.892 | 118.1 | 5.0 |

The performance of the threaded joint for oil well pipes according to the present invention was confirmed by a pressure-resistance performance test in accordance with Class IV of API-RP-5C5 (Evaluation Procedure for Casing and Tubing Connections). Each Sample used in the test was of API-L80 grade (yield strength=56.2 kg/mm$^2$, yield internal-pressure=741 kg/mm$^2$) and of pipe size: outer diameter of 88.9 mm and thickness of 6.45 mm. The result of the test is shown in Table 2.

In this test, six samples were used. The make up torque of each sample was set to be in a range from 250 kg·m to 450 kg·m until Stage 4 the test. The existence of leakage in the joint portion was inspected in the case where internal pressure (water pressure) was applied to the inside of the pipe repeatedly (Stage 2), in the case where tension was applied in addition to this internal pressure (Stage 3), and in the case where internal pressure (gas pressure) as well as tension was applied (Stage 4). As a result, no leakage was found out in any sample.

In addition, in Stage 5 of the test, the existence of galling was inspected under the condition that the make up torque was set to be 300 kg·m and make up and break out were repeated ten times. As a result, no galling was observed in any sample.

Further, in Stage 6 of the test, the make up torque of each sample was set to be in a range from 250 kg·m to 450 kg·m in the same manner as mentioned above. The existence of leakage in the threaded joint portion was inspected under the harder conditions (Stage 7). As a result, no leakage was found out here, either. In Stage 8 of the test, tensile rupture was performed on three samples. As a result, all the three samples were ruptured in the body portion of the pipes (each sample was broken in the body portion of the pipe at a load which was about 20% larger than the rated minimum load bearing ability), satisfying 100% of the joint strength (equivalent to the pipe strength).

As is apparent from the result of the above test, there is no problem on the pressure-resistance function against internal/external pressure and the galling resistance against make and break, and this joint satisfies the joint performance according to API-RP-5C5 Class IV.

TABLE 2

Summary of results of joint performance test
(samples API L80 88.9 mm OD × 6.45 mm WT)

| item | pressure | pressure medium | axial force | temp. | holding period | first sample | second sample | third sample | fourth sample | fifth sample | sixth sample |
|---|---|---|---|---|---|---|---|---|---|---|---|
| 1. make up | make up torque = 250 to 450 kg·m | | | — | | 270 kg·m | 300 kg·m | 290 kg·m | 410 kg·m | 400 kg·m | 420 kg·m |
| 2. internal pressure | 70 MPa | water pressure | — | room temp. | 30 min × 3 times | no leakage | no leakage | no leakage | no leakage | no leakage | no leakage |
| 3. internal pressure + tension | 56 MPa | water pressure | 740N | room temp. | 30 min × 3 times | no leakage | no leakage | no leakage | no leakage | no leakage | no leakage |
| 4. internal pressure + tension | 35 MPa | gas pressure | 740N | room temp. | 10 min × 10 times | no leakage | no leakage | no leakage | no leakage | no leakage | no leakage |
| 5. make up/break out | make up torque = 300 kg·m repetition = 10 times | | | | | no gallilng | no galling | no galling | no galling | no galling | no galling |
| 6. make up | make up torque = 250 to 450 kg·m | | | — | | 260 kg·m | 280 kg·m | 280 kg·m | 400 kg·m | 410 kg·m | 400 kg·m |
| 7. internal pressure + tension | 35 MPa | gas pressure | 740N | room temp. | 10 min × 50 times | no leakage | no leakage | no leakage | no leakage | no leakage | no leakage |
| 8. tension rupture | | | — | — | | pipe rupture | — | pipe rupture | — | pipe rupture | — |

What is claimed is:

1. A threaded joint for oil well pipes which comprises an oil well pipe having a male thread of a trapezoidal thread with a taper and a coupling member having a female thread of the trapezoidal thread with a taper, wherein t (thickness of said pipes)/D(outer diameter of said pipes) is not larger than 9%, and a load flank angle θ1 of said trapezoidal thread is a range of 0<θ1≦3°, wherein said trapezoidal thread has a shape such that when an interference Δd of not smaller than 0.12% and not larger than 0.8% of the outer diameter of said pipes is provided between said male and female threads by fastening said joint, opposite flanks of said male thread simultaneously come into contact with corresponding flanks of said female thread, and a gap is formed between a crest and a root of the respective male and female threads, and wherein said load flank angle $\theta 1$, a stabbing flank angle $\theta 2$ of said trapezoidal thread and dimensional tolerances of thread width and thread height of said trapezoidal thread satisfy the following condition (1) or (2) in order to make said gap not large than 0.2 mm:

$$10° \leq \theta 1 + \theta 2 > 20°, \quad (1)$$

tolerance of thread width (Wt)=±0.015 mm, and
tolerance of thread height (Ht)=±0.015 mm;

$$20° \leq \theta 1 + \theta 2, \quad (2)$$

tolerance of thread width (Wt)=±0.025 mm, and
tolerance of thread height (Ht)=±0.025 mm.

2. In a threaded joint for a pipe having a male trapezoidal thread with a taper and a member having a complementary female trapezoidal thread with a taper, the improvements:

wherein t (thickness of said pipe)/D(outer diameter of said pipe) is not larger than 9% and a load flank angle $\theta 1$ of said trapezoidal threads is in a range of $0 < \theta 1 \leq 3°$;

wherein said trapezoidal threads have a shape such that, when an interference $\Delta d$ of not less than 0.12% and not more than 0.8% of an outer diameter of said pipe is provided between said trapezoidal threads on fastening together as said threaded joint, opposite flanks of said male trapezoidal thread simultaneously come into contact with corresponding flanks of said female trapezoidal thread, and a gap is formed between crests and roots of said trapezoidal threads; and wherein said load flank angle $\theta 1$, a stabbing flank angle $\theta 2$ of said trapezoidal threads and dimensional tolerance of thread width and thread height of said trapezoidal threads satisfy the following condition (1) or (2) in order to make said not larger than 0.2 mm:

$$10° \leq \theta 1 + \theta 2 20°, \quad (1)$$

tolerance of thread width (Wt)=±0.015 mm, and
tolerance of thread height (Ht)=±0.015 mm; or $$20° \leq \theta 1 + \theta 2, \quad (2)$$

tolerance of thread width (Wt)=±0.025 mm, and
tolerance of thread height (Ht)=±0.025 mm.

* * * * *

UNITED STATES PATENT AND TRADEMARK OFFICE
CERTIFICATE OF CORRECTION

PATENT NO.   : 6,174,000 B1
DATED        : January 16, 2001
INVENTOR(S)  : Nishi et al.

It is certified that error appears in the above-identified patent and that said Letters Patent is hereby corrected as shown below:

Column 9,
Line 10, (claim 1, line 22) "$10° \leq \theta 1 + \theta 2 > 20°$" should read --
$10° \leq \theta 1 + \theta 2 < 20°$ --

Signed and Sealed this

Second Day of October, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,174,000 B1
DATED : January 16, 2001
INVENTOR(S) : Nishi et al.

Page 1 of 1

It is certified that error appears in the above-identified patent and that said Letters Patent is hereby corrected as shown below:

Column 9,
Line 10, "$10° \leq \Theta 1 + \Theta 2 > 20°$" should read -- $10° \leq \Theta 1 + \Theta 2 < 20°$ --

Column 10,
Line 15, "$10° \leq \Theta 1 + \Theta 2\ 20°$" should read -- $10° \leq \Theta 1 + \Theta 2 < 20°$ --

Signed and Sealed this

Twelfth Day of February, 2002

Attest:

Attesting Officer

JAMES E. ROGAN
*Director of the United States Patent and Trademark Office*